United States Patent [19]
Hudson et al.

[11] Patent Number: 6,057,933
[45] Date of Patent: May 2, 2000

[54] TABLE BASED FAST ERROR DIFFUSION HALFTONING TECHNIQUE

[75] Inventors: Kevin R. Hudson, Vancouver; Thomas B Pritchard, Prairie, both of Wash.

[73] Assignee: Hewlett-Packard Company, Palo Alto, Calif.

[21] Appl. No.: 08/961,047

[22] Filed: Oct. 30, 1997

[51] Int. Cl.[7] .................................................. H04N 1/46
[52] U.S. Cl. ........................................... 358/1.9; 358/502
[58] Field of Search .................... 395/109; 382/251–252, 382/162, 167; 358/502, 1.9, 518, 523

[56] References Cited

U.S. PATENT DOCUMENTS

| | | | |
|---|---|---|---|
| 3,916,096 | 10/1975 | Everett et al. | 178/6.6 R |
| 4,339,774 | 7/1982 | Temple | 358/283 |
| 4,891,714 | 1/1990 | Klees | 358/456 |
| 5,018,008 | 5/1991 | Asada | 358/518 |
| 5,107,332 | 4/1992 | Chan | 358/80 |
| 5,313,287 | 5/1994 | Barton | 358/458 |
| 5,375,002 | 12/1994 | Kim et al. | 358/521 |
| 5,444,461 | 8/1995 | Oz et al. | 345/154 |
| 5,623,281 | 4/1997 | Markandey et al. | 345/108 |
| 5,676,716 | 10/1997 | Shu | 358/518 |
| 5,761,394 | 6/1998 | Sugiura et al. | 382/162 |
| 5,867,599 | 2/1999 | Michealis et al. | 282/237 |

OTHER PUBLICATIONS

Hewlett–Packard Patent Application 08/812,777, 3/06/97, Fast Error Diffusion Alogrithm.

Hewlett–Packard Patent Application 08/880,475, 6/23/97 Correlating and Magenta Planes For Error Diffusion Halftoning.

*Primary Examiner*—Thomas D. Lef
*Assistant Examiner*—Stephen Brinich

[57] ABSTRACT

In an error diffusion process for an inkjet printer, a look-up table is indexed by an input color tone, with entries for base output level, base level error term, threshold error term, and whatever other data may be relevant. This table may be embodied in a conventional memory or software code. The base output level corresponds to the number of ink drops to be ejected by the inkjet print for particular ink colors, the base level error term reflects the error between the input and output of the look-up table, and the threshold error term is subtracted from the total error for the pixel if the base output level is incremented by one.

34 Claims, 6 Drawing Sheets

TABLE BASED FAST ERROR DIFFUSION HALFTONING TECHNIQUE

FIELD OF THE INVENTION

The present invention relates to a technique for image processing and, more particularly, to an error diffusion technique which employs a look-up table containing pre-calculated values.

BACKGROUND

Images, such as charts, drawings, and pictures, may be represented as a two-dimensional matrix of picture elements (pixels). The spatial resolution and intensity level for each pixel are chosen to correspond to the particular output device used. For example, typical computer monitors display images at 75 dots per inch (DPI) and have 256 levels of intensity for each color. Such monitors use the additive primary colors, red, green, and blue (RGB), which can be combined to produce millions of colors and also black.

Hardcopy output devices, such as color inkjet printers, are commonly provided with 3 color inks (cyan, magenta, yellow) or 4 color inks (CMY and black(k)). These printers eject droplets of ink to form dots on a medium. Such printers cannot print colors having 256 levels of intensity and must use halftoning so that the overall color tone in an area on the medium closely matches that of the original image for that area. Halftoning methods are described in the book Digital Halftoning, by Robert Ulichney, The MIT Press, 1987, incorporated herein by reference.

One major approach to halftoning is error diffusion. The decision about whether or not to print a dot of a particular color (or how many overlapping dots of a color to print) is based not only on the "ideal" intensity (i.e., one of the 256 possible intensities for a color) for that pixel, but on what has happened before for previously processed pixels. The present invention is directed to an error diffusion technique.

It is assumed in the following explanation that the pixel intensity may range between 0 and 255 and that a simple binary printer (dot or no dot for a pixel) is used. In error diffusion, at each point where a dot may be printed, the original image pixel intensity between 0–255, plus accumulated error, is compared to a previously chosen threshold value. If the image pixel intensity is greater than the threshold value, a dot (255 intensity) is assigned to that pixel. If not, no dot (0 intensity) is assigned. In either case, the intensity difference between the actual dot value assigned (0 or 255) and the ideal image pixel intensity plus accumulated error for that point is derived, and this difference becomes an error term that is "diffused" to neighboring, subsequently processed pixels. In other words, the diffused error term is added to the neighboring pixels. The total resultant image pixel intensity for the next pixel (including the diffused error) is then compared against the error diffusion threshold to determine whether a dot should be printed. A typical threshold value is 50% of the maximum theoretical image pixel intensity. For example, if there are 256 intensity levels (0 to 255) per pixel, a level of 128 may be chosen as the threshold value. In other error diffusion techniques, the threshold varies to avoid noticeable dot patterns being printed.

A well known error diffusion technique is described by R. Floyd and L. Steinberg in the paper Adaptive Algorithm for Spatial Grey Scale, SID Int'l. Sym. Digest of Tech. Papers, pp. 36–37 (1975), incorporated herein by reference. The Floyd and Steinberg error diffusion technique diffuses the error into a set of four surrounding pixels. Error diffusion with higher than four terms can also be used. U.S. Pat. No. 5,313,287 to David Barton, assigned to the present assignee and incorporated herein by reference, discloses another error diffusion technique.

When printing a color image, dots for three primary colors, cyan, magenta, and yellow, must be printed in various combinations to achieve the desired color tones to reproduce the original color image. Multiple dots of the same color may be used for a single color spot to increase the intensity of that color in the color spot.

Current Hewlett-Packard inkjet printers attempt to reproduce a near-continuous (256-level) input tone for a pixel location (cell) with relatively few primary output color levels, typically 2 to 4 levels per color. As a simplified example, a 4-level printer would be capable of printing levels for a single color ink designated 0, 1, 2, and 3, corresponding to, for example, 0, 1, 2, and 3 drops, respectively, of a single color ink per addressable cell. Other correlations between the color level 0–3 and the drops per level may be used. The base, or minimum, level to print in a current cell is determined by comparing the input tone value to a series of output level thresholds, or equivalently, taking the input tone value, scaling the value to the range of the output levels (e.g., a tone value of 1 equals 3/256), and taking the integer portion. For example, an input tone level of 128 would have a base output level of 128*3/256=1 drop. This produces an actual printed tone level of 1*255/3 or 85. In one type of error diffusion method, the remainder (128−85=43) is then added to the current error for the cell, and the accumulated error is compared to a threshold value to determine if the base level should be incremented by one. If the base level is incremented, the error is then recalculated and passed on to the appropriate neighboring cells.

The algorithm becomes more complicated as different numbers of output levels are used and different, and possibly asymmetric, output level thresholds are specified. This requires many specialized functions, as well as somewhat costly computations in figuring base levels and error terms.

SUMMARY

A solution to the complexity referred to above is to pre-calculate as much of the data used in the error diffusion process as is possible and encapsulate this data in a general purpose and performance-efficient form. One embodiment of the invention includes accessing a look-up table, indexed by the input color tone, with entries for base output level, base level error term, threshold error term, and whatever other data may be relevant. The look-up table may be embodied in a conventional memory or software code.

DETAIL DESCRIPTION OF THE EMBODIMENTS

Figure 1:
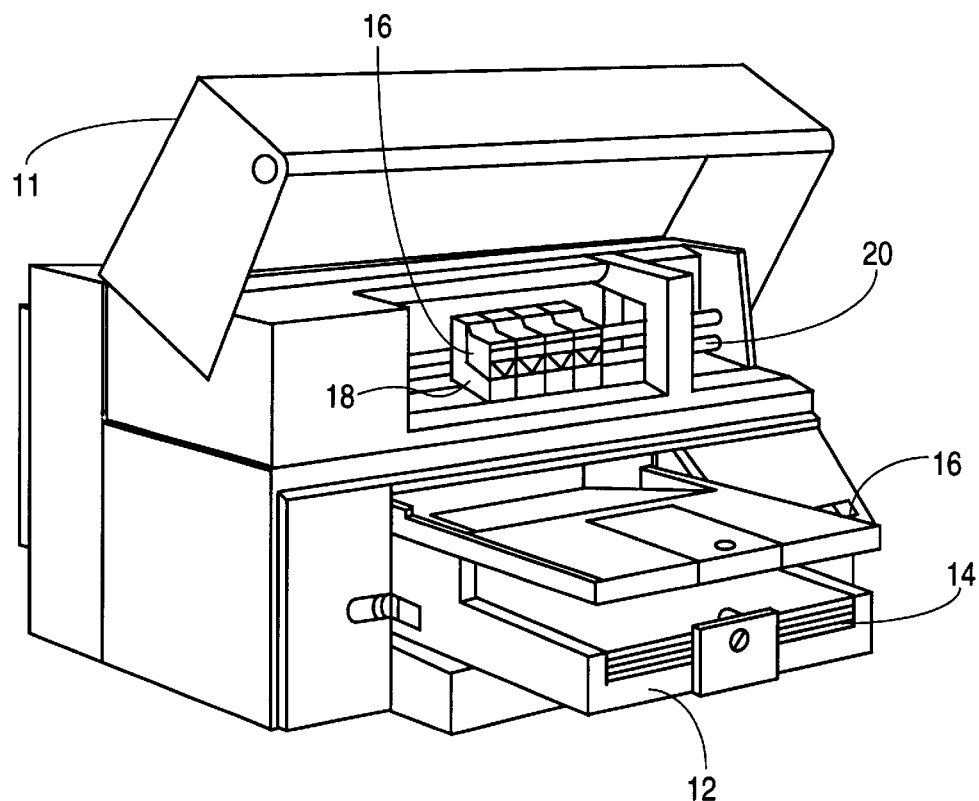
FIG. 1 illustrates a color inkjet printer which carries out all or a portion of the error diffusion technique described herein.

FIG. 1 illustrates one type of color inkjet printer 10 which includes processing circuitry for performing all or part of the error diffusion technique described herein. The color inkjet printer includes a cover 11, a paper tray 12 for holding virgin paper 14, an output tray for receiving the printed pages, color ink print cartridges 16, and a scanning carriage 18 for sliding along a slide bar 20 while dots are being printed on the paper. In one embodiment, the color print cartridges 16 including cyan (C), magenta (M), yellow (Y), and black (K) ink print cartridges. Other combinations of ink, such as CMY, or even a single color ink may also be used. Further, a separate print cartridge need not be provided for each color ink; a single replaceable print cartridge may include two or more colors of ink with an associated array of ink ejection nozzles for each color. Also, the ink supply for each of the scanning printheads may be stationary and connected to the printheads by a tube. Inkjet print cartridges in inkjet printers are well known to those of ordinary skill in the art. U.S. Pat. No. 5,594,481, entitled Ink Channel Structure for Inkjet Printhead, to Brian J. Keefe et al., describes the structure of a suitable inkjet print cartridge. This patent is assigned to the present assignee and incorporated herein by reference.

Figure 2:
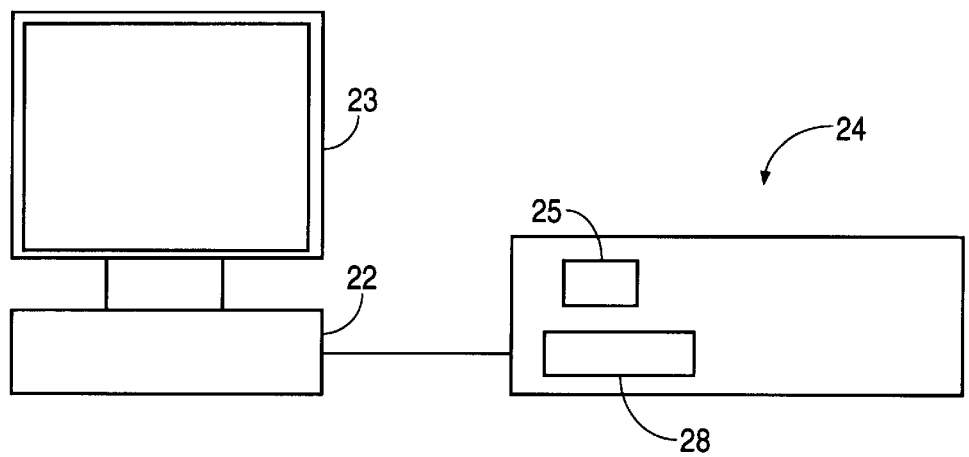
FIG. 2 illustrates a color inkjet printer and a computer connected to the printer, where the computer or the printer, or both, carry out the inventive error diffusion technique.

FIG. 2 is a schematic diagram of a printing system which includes a host computer 22, a monitor 23 (e.g., a CRT), and a printer 24. Printer 24 could be any type of printer which prints color dots, including an inkjet printer. Printer 24 includes color print cartridges 25 which scan across a medium and print droplets of color ink as described below. Printer 10 of FIG. 1 may be substituted for printer 24 of FIG. 2.

Printer 24 includes a printer controller 28 which receives coded signals from computer 22 and provides firing signals to the print cartridges 25 to print color dots. The print cartridges may print at 300 dots-per-inch (DPI), 600 DPI, or any other resolution. If multiple drops of the same color ink are to be deposited over the same pixel position to print a multi-drop ink spot on a medium, the carriage containing print cartridges 25 may make multiple scans across the medium to print such overlapping dots.

The techniques described herein for converting an RGB image generated by computer 22 to ink droplets ejected from print cartridges 25 may be implemented using a combination of hardware and software, where portions of the hardware/software are located in computer 22 and other portions located in printer 24. The location of the hardware/software for carrying out this method is a matter of design choice.

Figure 3:
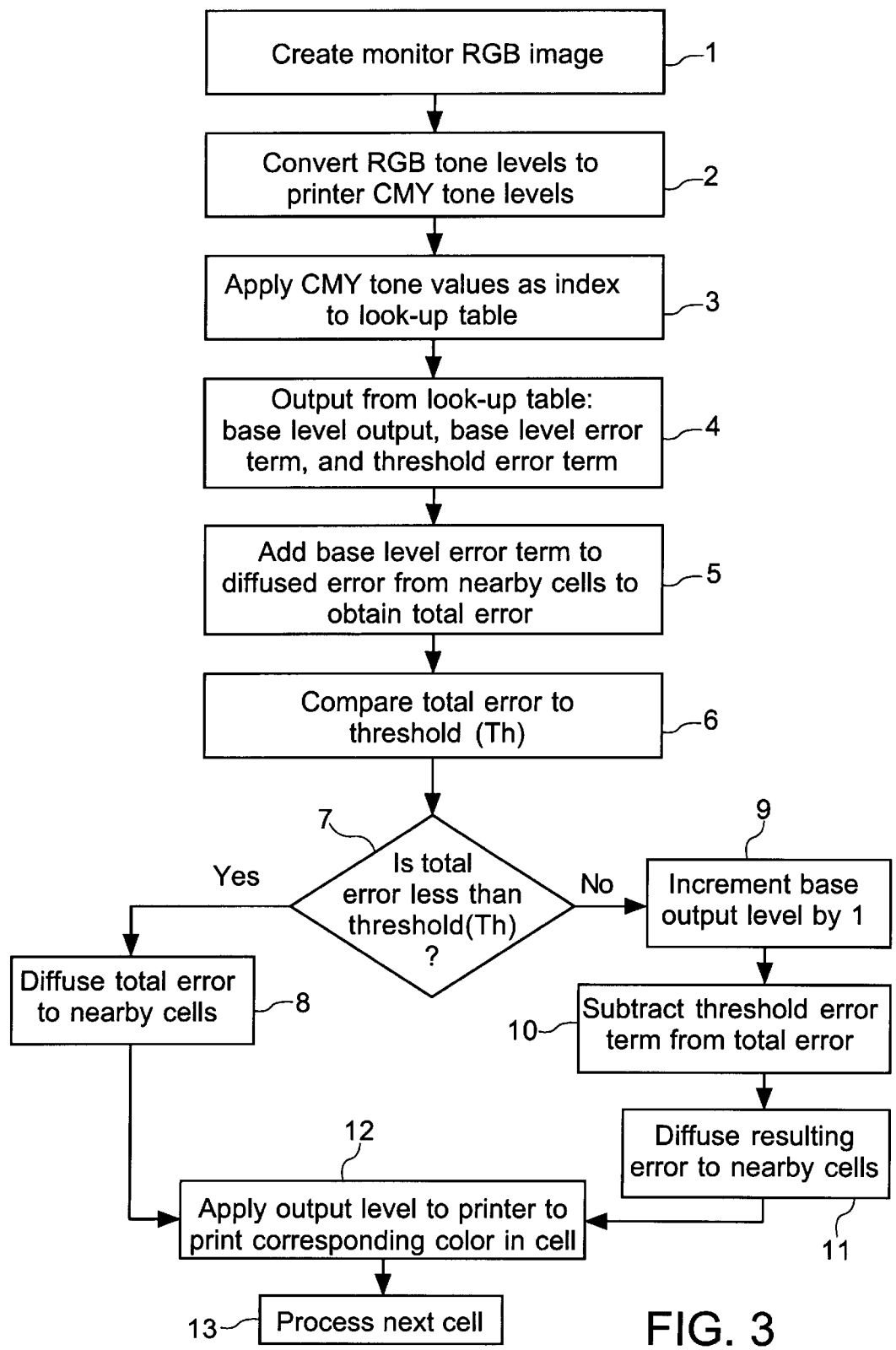
FIG. 3 is a flowchart illustrating the basic steps in the error diffusion technique.
Figure 4:
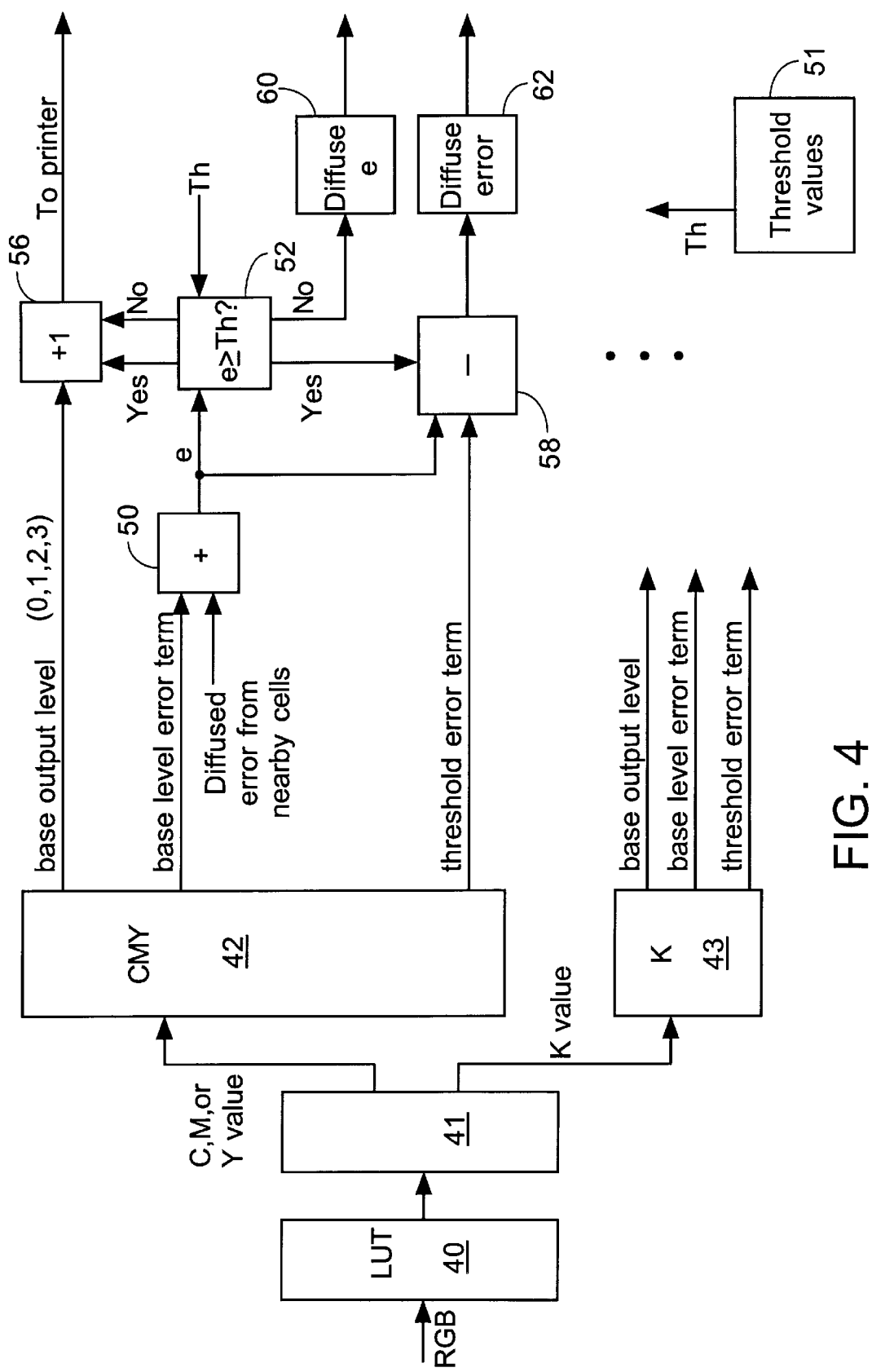
FIG. 4 illustrates one implementation of the error diffusion technique.

FIG. 3 is a flowchart illustrating the general method carried out by the implementation of FIG. 4, which is only one embodiment of the invention. It is assumed in the flowchart of FIG. 3 that the image to be printed by the printer is first generated in a computer; however, the original image may be generated by any other means.

In step 1 of FIG. 3, a color image is generated by a computer and displayed on a monitor using conventional means. A typical computer generates signals for a monitor to display the additive primary colors, red, green, and blue (RGB), which can be combined to produce millions of colors and also black. Typically, there are 256 levels of intensity for each primary color, so that each of the primary colors may be identified using an 8-bit byte. A typical computer monitor displays images at 75 dots per inch. A 24-bit RGB color image is held in the memory of computer 22 so that it can be displayed on monitor 23.

In step 2 of FIG. 3, the RGB image is converted to a CMYK image (assuming black ink is used) at the resolution of the printer 24. Inkjet printer 24 may have a resolution of 300, 600, or even 1200 dots per inch. This conversion also performs color correction to compensate for the CMYK ink colors and the inherent limitations of printing colors with ink. For example, some RGB colors on a monitor cannot be printed, so these RGB colors must be mapped to the closest color that can be printed. Such resolution conversion and color correction to best match the monitor color to a printed color are known in the art. In the preferred embodiment, a combination of a look-up table 40 (FIG. 4) and a software interpolation routine 41 is used to perform the color conversion. The most significant 4 bits of each of the RGB colors is applied as an index to the look-up table 40. The remainder of the bits are used to interpolate the output of the look-up table 40 to obtain the closest color in CMYK ink space. The result of the interpolation is a 32-bit CMYK color code for each pixel at the resolution of the printer. If only C, M and Y color inks are used, the K output is zero. In another embodiment, the interpolation routine 41 is deleted and one or more look-up tables are used to convert the RGB values into color corrected CMYK values.

If the printer prints fewer than CMYK inks, such as black ink only, the RGB color image must be converted into a corresponding tone level for that particular ink. For black ink only, the RGB colors would be converted into a gray scale tone level using a look-up table or any other means.

The look-up table 40 may be implemented in software or hardware.

In step 3 of FIG. 3, and as shown in FIG. 4, C, M, and Y tone values are applied to look-up table 42, and the K tone value is applied to look-up table 43. In the embodiment of FIG. 4, the C, M, and Y values are each applied to the look-up table 42 at separate times. The subsequent logic performed on the output of the look-up table 42 knows which of the C, M, or Y colors is being processed.

Figure 5:
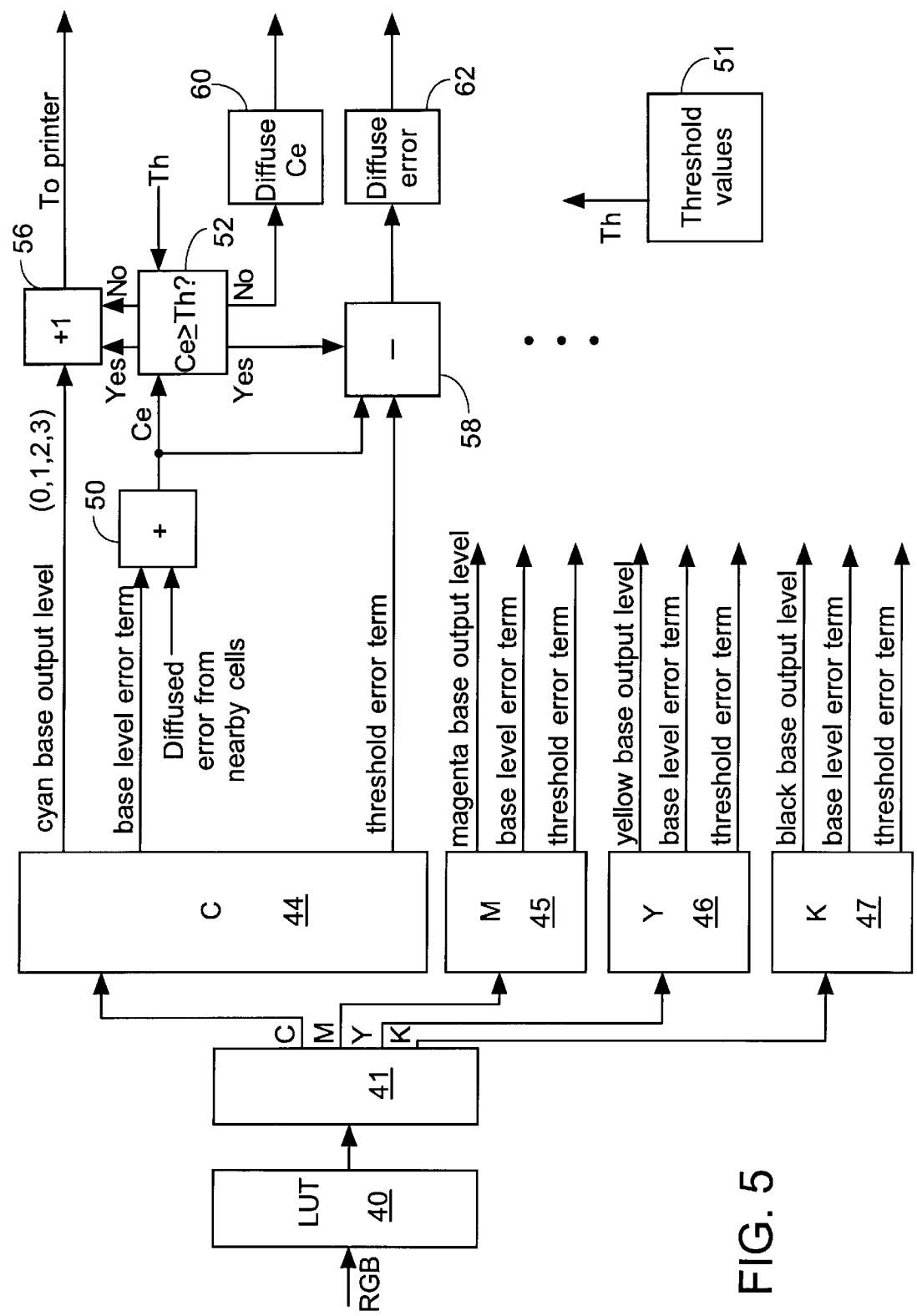
FIG. 5 illustrates an alternative implementation of the error diffusion technique.

In an alternate embodiment, shown in FIG. 5, the C component tone value is applied to look-up table 44, the M component of the tone value is applied to look-up table 45, the Y component of the tone value is applied to look-up table 46, and the K component of the tone value is applied to look-up table 47.

Since the logic functions applied to the output of each of the look-up tables 42–47 are identical, only the logic functions performed on the output of a single look-up table 42 will be described in detail.

Each of the look-up tables 42–47 is programmed to output three 8-bit values upon being indexed with an 8-bit tone value. For convenience, each addressable word contains four bytes, where one of the bytes is not currently used but may be used for a future implementation. The three output bytes convey: base output level, base level error term, and threshold error term (step 4). The base output levels in this particular embodiment are 0, 1, 2, or 3. These levels are related to the intensity level of that particular ink color. The 0, 1, 2, or 3 value identifies the number of drops of that color ink to be deposited on the medium by the printer in a particular pixel position or cell. These four levels may correspond to 0, 1, 2, or 3 ink drops, or 0, 1, 3, or 8 ink drops, or any other correlation between the level and the number of ink drops. Overlapping ink drops on a medium may be achieved by using multiple scans of the printhead across the medium while the medium is held stationary by the printer.

As will be described in greater detail later, the particular embodiment described includes logic for incrementing the base level output by one when the accumulated error for that cell exceeds a certain threshold. This can result in a negative error, due to the increased darkness for that cell. In other cases, a positive error is generated for that cell. If the base output level is incremented, the threshold error term is used. In alternative embodiments, there is no means for incrementing the output level, and the error will always be positive. Thus, in these alternative embodiments, there is no threshold error term generated.

In step 5 of FIG. 3, the base level error term is summed (by summer 50) with the diffused error from nearby cells generated in previous operations. The diffused errors may be stored in an image map memory and addressed at the appropriate time by an ASIC or other processor to apply the appropriate diffused error to the summer 50.

The output of summer 50 is the total error for that cell, given the base output level.

External to look-up tables 42–47 may be a separate look-up table 51 or an algorithm for generating a threshold (Th) for that particular cell. This threshold may be obtained from a list of thresholds, for example, between 5 and 69, with randomly listed thresholds being sequentially addressed and applied to a cell. A threshold may also be a fixed threshold for a plurality of cells; however, it is known that varying the thresholds reduces the likelihood of visual artifacts in a printed image.

In step 6, this threshold (Th) is applied to one input of a comparator 52, where the other input is the total error for the cell. If a total error is less than the threshold (step 7), the base output level is not incremented and the total error for the cell is diffused to neighboring cells (step 8).

In one embodiment of the invention, half of this total error is diffused to the cell immediately to the right of the current cell being processed (i.e., the next cell to be processed), and half of the total error is diffused to the cell immediately below the cell being processed. Other error diffusion techniques may also be used, such as four-term error diffusion, where one fourth of the total error is applied to four neighboring cells. These cells may be the cell immediately to the right of the current cell and the three adjacent cells below the cell being processed. In one embodiment, cells are processed from left to right and from row to row. In other embodiments, the cells are processed in a serpentine fashion.

If comparator 52 determines that the total error is equal to or greater than the threshold (Th), then the output level is to be incremented by one (step 9). This is illustrated in FIGS. 4 and 5 by issuing a signal to incrementor 56 to increment the base output level.

Incrementing the base output level by one, in the present embodiment, causes the printed color spot to be darker for that particular color. In step 10, a subtractor 58 subtracts the threshold error term output by look-up table 42 or 44 from the total error for the cell and outputs the resulting error value. The resulting error output from subtractor 58 may be positive or negative. The resulting error output from subtractor 58 is then diffused (step 11) to neighboring pixels as previously described.

The error diffusion shown by blocks 60 and 62 may be performed by an ASIC in conjunction with a memory or by the computer itself.

The resulting base output level is then sent to the printer (step 12) for printing the appropriate number of dots for that particular color, and the next cell is processed (step 13).

The identical logical functions are performed for the magenta and yellow components. A black ink look-up table 43 or 47 and accompanying logic may be incorporated if black ink is also used. If the black ink has the same ink drop volume and resolution as the C, M, and Y inks, the black ink look-up table 43 in FIG. 4 may be deleted, and look-up table 42 may be used for the black ink.

Appendix 1 shows values for a particular look-up table indexed by one of 256 tone levels.

The present invention eliminates the profusion of test clauses and complexity as the number of output levels increases. Previous solutions required distinct and custom functions for every permutation of the output levels and tone-to-output-level mapping. The calculations used for the look-up table entries may be extremely complex since they are not performed in real time. For example, since the intensity of a color may not be linearly related to the number of ink drops, this characteristic can be fully taken into account when generating the table values.

An additional benefit of using look-up tables in the error diffusion process, rather than performing computations in real time, is that output parameters can be dynamically changed, including the number of output levels, tone-to-output-level mapping, and ink-volume mapping, without modifying any algorithm. As an example, consider the case where the print cartridge firing drop volume is approximately 10% below nominal, and it is desired to increase the aggregate number of dots printed by a corresponding 10% to compensate. For the 2-level (binary) output case, this would mean a simple 10% scaling of the error term output by the look-up table for each tone entry. Multi-level cases can be done similarly.

The entries in these look-up table can also take into account the non-linear nature of the ink-on-paper color space, where an algorithm would be too complex to calculate the effects of the ink on paper in real time. For example, for certain types of paper, the luminance of the printed color spot may have an exponential relationship to the number of drops printed. This can be easily incorporated into the table, whereas on-the-fly calculations could be prohibitively performance costly.

Figure 6A:
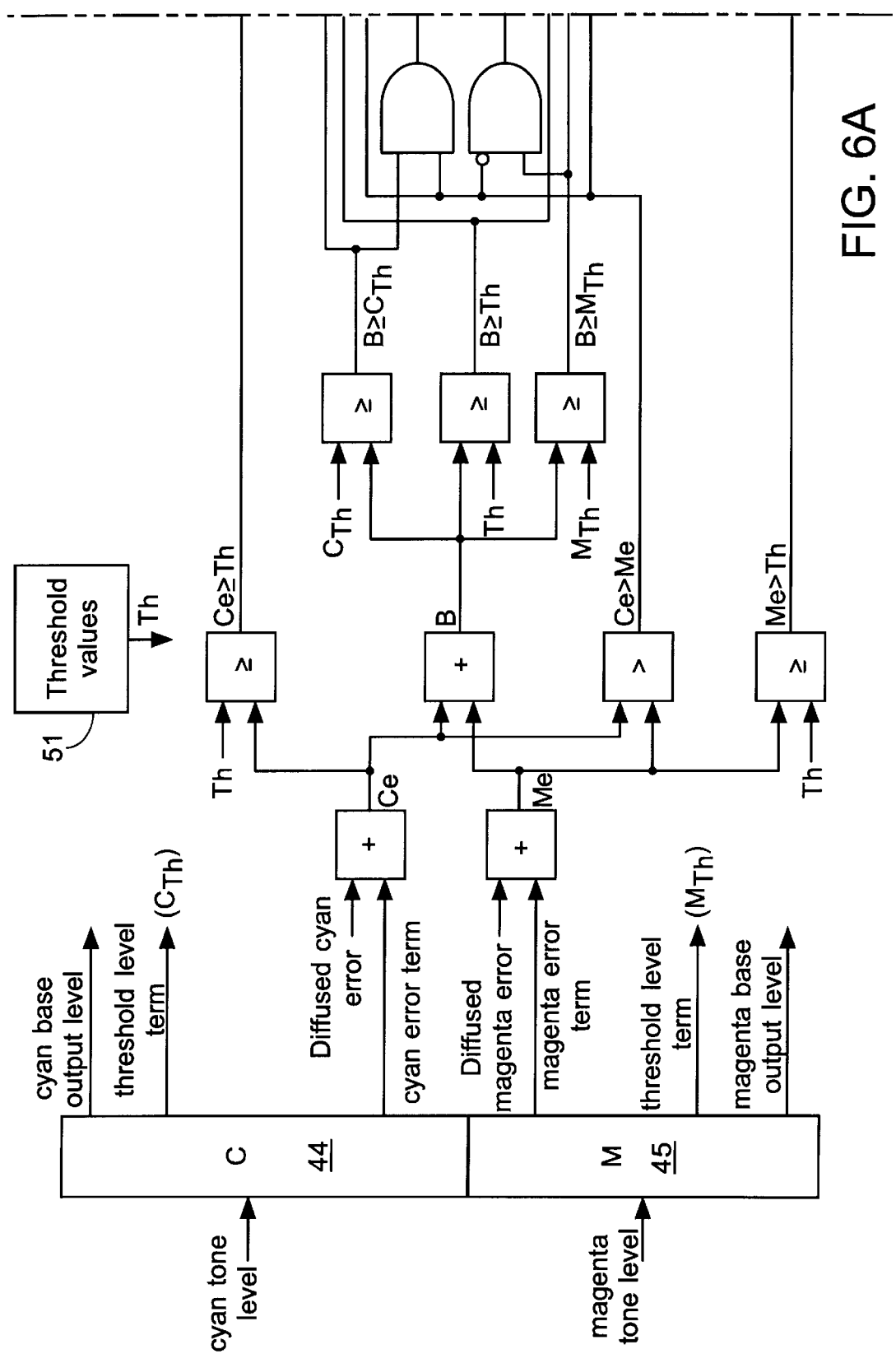
FIG. 6 illustrates a hardware or equivalent software implementation of a color plane-dependent error diffusion technique.
Figure 6B:
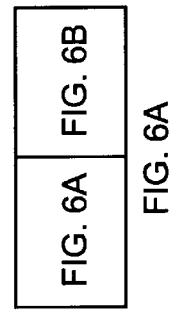
Figure 6B:
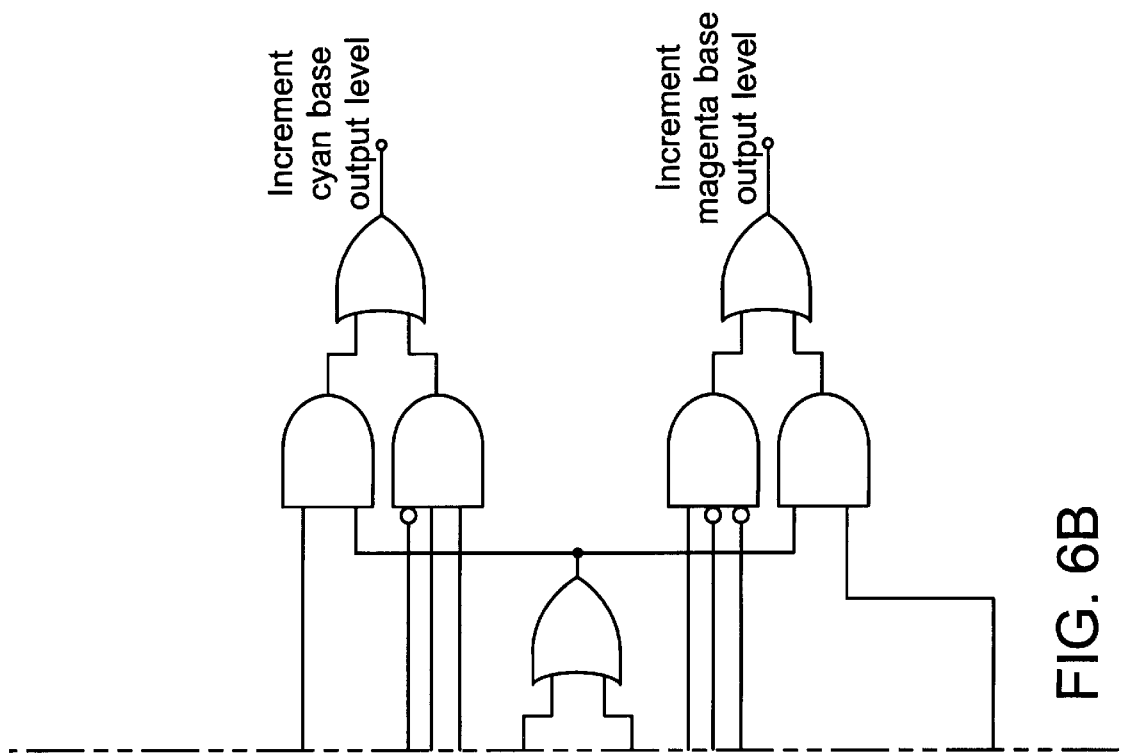

Another benefit of using look-up tables is that color plane-dependent fast error diffusion may be performed, which may be too complex when performing calculations in real time. To avoid graininess in the printed image, it may be desirable to avoid both cyan levels and magenta levels in the same cell being incremented by one. One color plane-dependent implementation is shown in FIG. 6. This implementation avoids color spots which are noticeably darker than neighboring spots, thus limiting graininess.

The implementation of FIG. 6 allows both the cyan and magenta base output levels to be incremented in the same cell only when certain criteria are met, even though both the cyan and magenta errors are above the threshold (Th). Otherwise, only one of the cyan or magenta base output levels will be incremented based on which color has the most error and whether the threshold error term is less than the total error.

In FIG. 6, the following terms are used:
cyan total error=$C_e$
magenta total error=$M_e$
total cyan and magenta error=B
cyan threshold error term from LUT=$C_{TH}$
magenta threshold error term from LUT=$M_{TH}$
threshold level for cell=Th
For cyan level increment:
1. ($C_e \geq$Th) and [(B$\geq C_{TH}$ and $C_e > M_e$) or (B$\geq M_{TH}$ and $\overline{C_e > M_e}$)] OR
2. ($\overline{B \geq C_{TH}}$ and B$\geq$Th and $C_e > M_e$)

For magenta level increment:
1. ($M_e \geq Th$) and [($B \geq C_{TH}$ and $C_e > M_e$) or ($B \geq M_{TH}$ and $\overline{C_e > M_e}$)] OR
2. $\overline{B \geq M_{TH}}$ and $B \geq Th$ and $C_e > M_e$ In a preferred embodiment, the look-up tables and algorithm for controlling the error diffusion process are provided on a computer readable medium, such as a microdiskette or floppy diskette as a printer driver. This printer driver is then installed into the computer, such as computer 22 in FIG. 2, so that the program is installed in the computer's RAM. Such a program may be also installed in the printer and, in one embodiment, installed in firmware within the printer. This program would depend on the print mode or printhead parameters as well as other factors. All logic functions may be implemented in hardware or software. If hardware is used, the various table values would be available to the circuitry implementing the halftone algorithm via bus lines. The algorithm may also be carried out by an ASIC, which controls the timing and transfer of data to the various logic devices and look-up tables as well as to and from the image map, as would be understood by those skilled in the art after reading this disclosure.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A system for use in printing comprising:
   at least one look-up table, said at least one look-up table being indexed by a color tone value, said at least one look-up table outputting at least an output level value and an error value, said error value reflecting a difference between said output level value and said color tone value,
   said error value for being diffused to pixels neighboring a pixel being processed;
   a summer for adding said error value and an accumulated error for said pixel being processed to generate a total error; and
   an incrementor for incrementing said output level value by one if said total error for said pixel being processed is greater than a threshold value.

2. The system of claim 1 wherein said at least one look-up table also outputs a threshold error term, said system further comprising:
   a subtractor for subtracting said threshold error term from said total error if said total error is greater than a threshold value.

3. The system of claim 2 further comprising an error diffuser for diffusing the resulting error output by said summer when said output level value is not incremented and diffusing a resulting error output by said subtractor when said output level value is incremented.

4. The system of claim 3 wherein color tone values for indexing said at least one look-up table include color tone values for ink colors which are printed by a printer.

5. The system of claim 4 where said ink colors include cyan, magenta, and yellow.

6. The system of claim 1 further comprising a printer which receives values corresponding to said output level values from said at least one look-up table and incremented output level values and prints ink dots on a medium in response thereto.

7. The system of claim 6 further comprising a computer connected to said printer.

8. The system of claim 1 wherein said at least one look-up table comprises a plurality of look-up tables, each look-up table being associated with a particular color ink printable by said ink printer.

9. A system of claim 1 wherein said at least one look-up table is indexed by a plurality of color tone values.

10. The system claim 1 further comprising logic which receives an error value for a cyan tone and an error value for a magenta tone and which determines, based at least in part upon said error value for said cyan tone and said error value for said magenta tone, whether said incrementor increments an output level value for said cyan tone and an output level value for said magenta tone.

11. The system of claim 1 wherein said output level value corresponds to a number of ink drops to be printed by an ink printer for particular ink colors.

12. The system of claim 1 wherein each said color tone value is in an image formed by pixels.

13. A method for using printer comprising:
   generating color tone values;
   indexing at least one look-up table with said color tone values;
   outputting by said at least one look-up table at least an output level value and an error value, said error value reflecting a difference between said output level value and a color tone value indexing said at least one look-up table,
   said error value for being diffused to pixels neighboring a pixel being processed;
   outputting, by said at least one look-up table, a threshold error term;
   summing said error value and an accumulated error for said pixel being processed to generate a total error;
   subtracting said threshold error term from said total error if said total error is greater than a threshold value; and
   incrementing said output level value by one if said total error for said pixel being processed is greater than said threshold value.

14. The method of claim 13 further comprising the step of:
   diffusing a resulting error output after said step of summing when said output level value is not incremented and diffusing a resulting error output after said step of subtracting when said output level value is incremented.

15. The method of claim 13 wherein said color tone values for indexing said at least one look-up table include color tone values for ink colors which are printed by a printer.

16. The method of claim 15 wherein said ink colors include cyan, magenta, and yellow.

17. The method of claim 13 wherein said output level value corresponds to a number of ink drops to be printed by an ink printer for particular ink colors.

18. The method of claim 13 wherein each said color tone value is in an image formed by pixels.

19. A system for use in printing comprising:
   at least one look-up table, said at least one look-up table being indexed by a color tone value, said at least one look-up table outputting at least an output level value, an error value, and a threshold error term, said error value reflecting a difference between said output level value and said color tone value, said error value for being diffused to pixels neighboring a pixel being processed, said threshold error term for being substracted from a total error for said pixel.

20. The system of claim 19 further comprising:

a summer for adding said error value and an accumulated error for said pixel being processed to generate a total error;

a subtractor for subtracting said threshold error term from said total error if said total error is greater than a threshold value; and an incrementor for incrementing said output level value by one if said total error for said pixel being processed is greater than said threshold value.

21. The system of claim 20 further comprising an error diffuser for diffusing the resulting error output by said summer when said output level value is not incremented and diffusing a resulting error output by said subtractor when said output level value is incremented.

22. The system of claim 21 wherein color tone values for indexing said look-up table include color tone values for ink colors which are printed by a printer.

23. The system of claim 22 where said ink colors include cyan, magenta, and yellow.

24. The system of claim 19 further comprising a printer which receives values corresponding to said output level values from said look-up table and incremented output level values and prints ink dots on a medium in response thereto.

25. The system of claim 24 further comprising a computer connected to said printer.

26. The system of claim 19 wherein said look-up table comprises a plurality of look-up tables, each look-up table being associated with a particular color ink printable by said ink printer.

27. A system of claim 19 wherein said look-up table is indexed by a plurality of color tone values.

28. The system of claim 19 further comprising:

a summer for adding said error value and an accumulated error for said pixel being processed to generate a total error; and an incrementor for incrementing said output level value by one if said total error for said pixel being processed is greater than a threshold value.

29. The system claim 28 further comprising logic which receives an error value for a cyan tone and an error value for a magenta tone and which determines, based at least in part upon said error value for said cyan tone and said error value for said magenta tone, whether said incrementor increments an output level value for said cyan tone and an output level value for said magenta tone.

30. A method for using printer comprising:

generating color tone values;

indexing at least one look-up table with said color tone values;

outputting by said at least one look-up table at least an output level value, an error value, and a threshold error term, said error value reflecting a difference between said output level value and a color tone value indexing said at least one look-up table, said error value for being diffused to pixels neighboring a pixel being processed, said threshold error term for being substracted from a total error for said pixel.

31. The method of claim 30 further comprising the steps of:

summing said error value and an accumulated error for said pixel being processed to generate a total error;

subtracting said threshold error term from said total error if said total error is greater than a threshold value; and incrementing said output level value by one if said total error for said pixel being processed is greater than said threshold value.

32. The method of claim 31 further comprising the step of:

diffusing a resulting error output after said step of summing when said output level value is not incremented and diffusing a resulting error output after said step of subtracting when said output level value is incremented.

33. The method of claim 30 wherein said color tone values for indexing said at least one look-up table include color tone values for ink colors which are printed by a printer.

34. The method of claim 33 wherein said ink colors include cyan, magenta, and yellow.

* * * * *